United States Patent [19]

Charonnat

[11] 4,422,683
[45] Dec. 27, 1983

[54] LEVEL DETECTOR AND ITS APPLICATION TO A GRABBING APPARATUS FOR CONTAINERS OR THE LIKE

[75] Inventor: Henri Charonnat, Pont Saint Martin, France

[73] Assignee: Brissonneau et Lotz Marine, Carquefou-Nantes, France

[21] Appl. No.: 271,669

[22] Filed: Jun. 8, 1981

[30] Foreign Application Priority Data

Jun. 11, 1980 [FR] France ............................... 80 12955

[51] Int. Cl.³ ............................................. B66C 13/04
[52] U.S. Cl. ................................................ 294/86 LS
[58] Field of Search ......... 294/815 F, 86 LS, 67 DA; 44/137, 139, 626; 318/648, 649; 33/333, 384, 385, 386, 387, 388

[56] References Cited

U.S. PATENT DOCUMENTS 4,245,941 1/1981 Charonnat ...................... 294/815 F

FOREIGN PATENT DOCUMENTS 7727295 9/1977 France .
604795 4/1978 U.S.S.R. ............................ 294/815 F Primary Examiner—James B. Marbert
Attorney, Agent, or Firm—Rines and Rines, Shapiro and Shapiro

[57] ABSTRACT

This level detector comprises a tubular body closed at each of its ends and displaying a planar or slightly concave roller track, a ball suited to roll on the said roller track toward one or the other of the said closed ends of the body as a function of the inclination of the detector to the horizontal, and two receptors to detect the presence of the ball respectively at one and the other of the said ends and to emit a signal in response to this detection. This level detector can be installed on a grabbing apparatus in order to remember and preserve during hoisting the initial attitude of a load seized by the grabbing apparatus.

16 Claims, 8 Drawing Figures

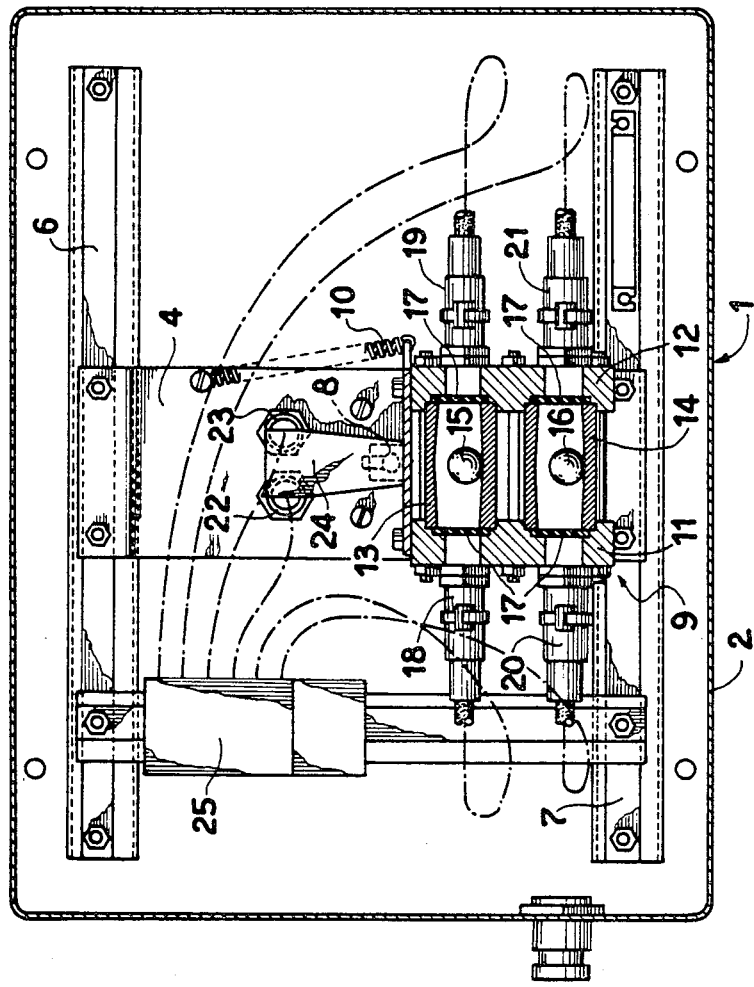
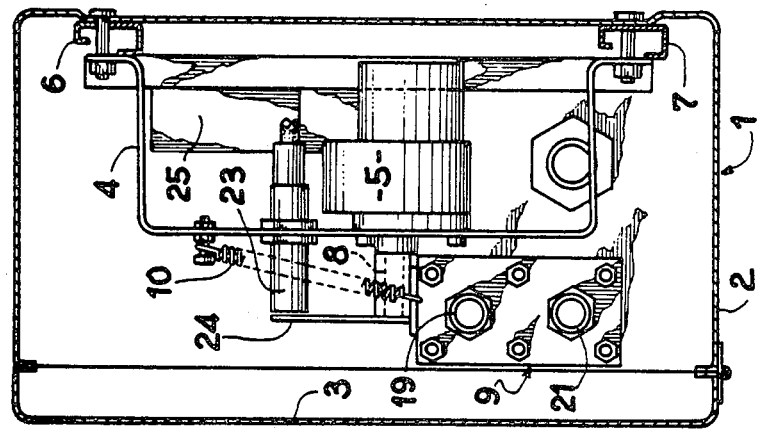

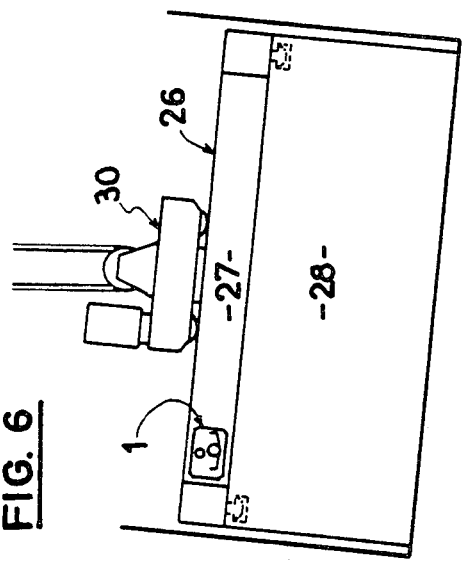
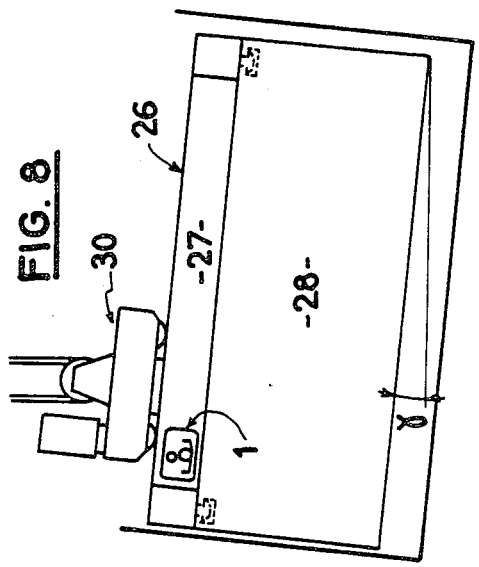
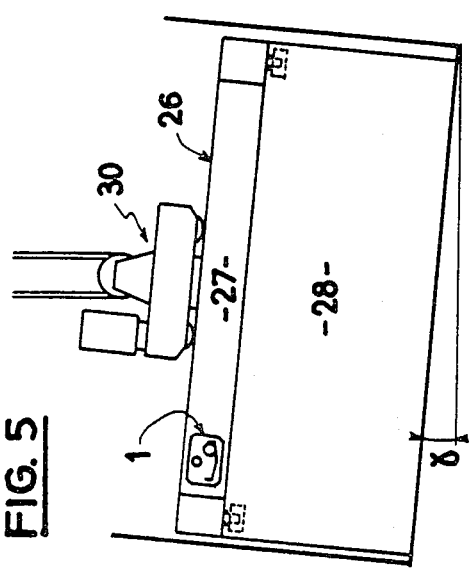
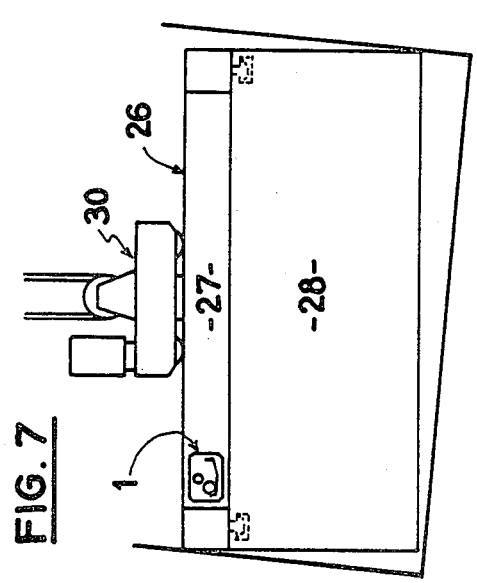

LEVEL DETECTOR AND ITS APPLICATION TO A GRABBING APPARATUS FOR CONTAINERS OR THE LIKE

The present invention concerns a level detector and the application of such a detector to a grabbing apparatus for containers or the like.

The French patent application number 77.27 295 of Sept. 9, 1977, corresponding to U.S. Pat. No. 4,245,941, issued Jan. 20, 1981, to Charonnat and assigned to the assignee of the present invention, describes a grabbing apparatus for containers or the like which comprises a level detector consisting of two liquid reservoirs communicating with one another through a channel, and in one of which are installed two magnetized floats adapted to close a corresponding contact according to whether the level detector is inclined in one direction or the other to the horizontal.

Although the grabbing apparatus described in the aforementioned French patent application and U.S. patent responds in overall fashion to the requisite conditions of operation, the use of a liquid level detector nevertheless presents a certain number of disadvantages. First of all, the precision of stopping, with regard to the correction of the attitude of the detector on the load as well as with regard to the displacement of the point of suspension along the grabbing apparatus, is a function of the circulation of the liquid in the channels, the quantity of liquid to be circulated being proportionally greater the more significant the initial inclination. Moreover, the viscosity of the liquid varies as a function of the temperature, and it is always possible for losses of liquid capable of making the detector inoperative. It is also to be noted that the correction of attitude which can be ensured by this detector is limited to a relatively small angle of the order of ±2°, and that fluctuations of function can arise by reason of the speed of displacement of the liquid and oscillations in its level. Finally, by its very design, a liquid level detector presents a significant weight and an encumbrance.

The invention thus has as its goal to achieve a level detector enabling elimination of these inconveniences, and also concerns a grabbing apparatus equipped with such a level detector.

To this end, the invention has as its object a level detector comprising a tubular body closed at each end, and displaying a planar or slightly concave roller track, a ball fit to roll on the said roller track toward one or the other of the said closed ends of the body as a function of the inclination of the detector to the horizontal, and two sensers to detect the presence of the ball at the two respective ends and to emit a signal in response to such detection.

According to a characteristic feature of the invention, the ball is a metallic ball, and the sensers are inductive detectors positioned outside of the said closed ends of the body.

According to another characteristic feature of the invention, the roller track presents a concave profile symmetrical with respect to a central point equidistant from the closed ends.

According to still another characteristic feature of the invention, the body presents the form of two identical truncated cones meeting at their largest base.

In summary, the invention also has as its object level detecting apparatus for use with a grabbing device of a type comprising a frame suspended at a point from a manipulating mechanism, and intended to be brought against a load, such as a container; means to bolt the frame to the load; means to displace the point of suspension along a reference direction of the frame; the level detecting apparatus comprising a level detector joined onto the frame to pivot in a vertical plane parallel to or along the said reference direction, and suited to provide an output signal when a lack of horizontality occurs; means of actuation of the detector; means of subordinating the said means of actuation of the detector to the output signal of the detector so as to command the automatic rocking of the detector in its horizontal position, in the position in which the frame is in place on the load, preliminary to the hoisting of the load by the grabbing apparatus; means of inhibition of the means of subordination to maintain the detector during hoisting of the load in its relative position with respect to the frame, in which it remembers the angle of attitude of the load; and means sensitive to the said output signal to command, during hoisting of the load, the displacement of the said point of suspension into a position in which it cancels the lack of horizontality of the detector; this grabbing apparatus being remarkable in that the level detector consists of the ball level detector defined above.

Other characteristics and advantages of the invention will become apparent from the description to follow, given with reference to the appended drawings, given solely by way of a preferred embodiment or mode in which:

FIG. 1 is a side view, partially cut away, of an attitude memory apparatus with two level detectors according to the invention, intended to equip a grabbing apparatus;

FIG. 2 is a front view, partially cut away, of the attitude memory apparatus of FIG. 1;

FIGS. 5 to 8 are schematic views showing the different phases of operation governing the hoisting of a container from a hold of a ship presenting a significant trim angle.

Figure 4:
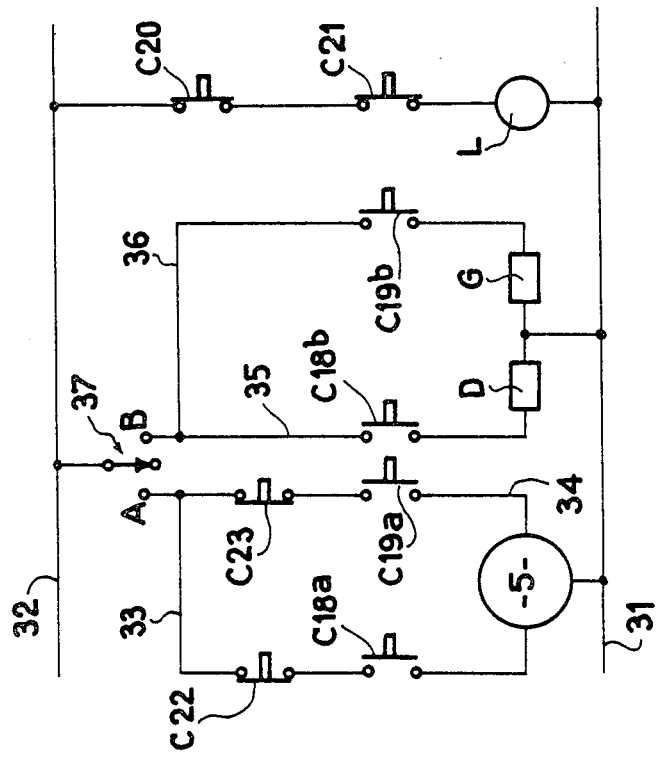
FIG. 4 is an electrical schematic of a simplified control circuit of a grabbing apparatus equipped with the attitude memory apparatus of FIGS. 1 and 2.

Referring first to FIGS. 1 and 2, the attitude memory apparatus 1 comprises a case 2 provided with an access port 3, and within which a support console 4 of a reduction motor 5 is attached to two beams 6 and 7.

The shaft 8 of the reduction motor 5 bears an assembly 9 of two level detectors, and a spring 10 is provided between the assembly 9 and the console 4 to eliminate any play of construction and keep the gearing of the reduction motor under constant pressure. The assembly 9 consists essentially of two end caps 11 and 12, between which are held two tubular bodies 13 and 14 defining the roller tracks for the balls 15 and 16 respectively. Each of the bodies 13 and 14 is closed at its two ends by rubber plates 17 serving to delimit the roller tracks of the balls 15 and 16, while damping the shocks which they could provoke when the assembly 9 is inclined in one direction or the other. In addition, coaxially to the bodies 13 and 14, the end caps 11 and 12 are pierced by openings intended to accept the ends of inductive proximity detectors 18 and 19 on the one hand, and 20 and 21 on the other. The proximity detectors 18 and 19 are associated with the body 13, and furnish a signal when the ball 15 is in contact with the respective plate 17, while the proximity detectors 20 and 21 are associated with the body 14, and in the same way furnish a signal when the ball 16 is in contact with the respective plate 17. Such inductive proximity detectors are entirely conventional, and may be constituted, for example, by those marketed by the Telemecanique Corporation, under the designation XSA-A05.

Figure 3:
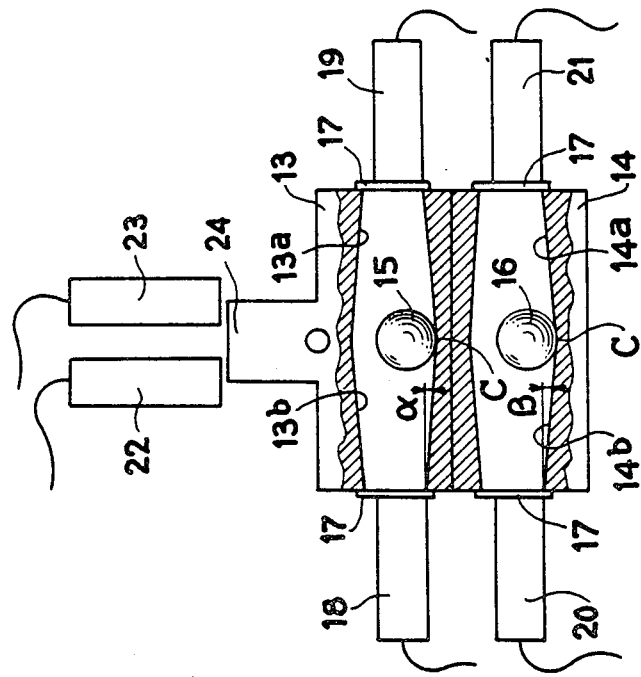
FIG. 3 is a schematic cutaway view at larger scale of the two level detectors of the attitude memory apparatus of FIGS. 1 and 2.

As shown in greater detail in FIG. 3, the bodies 13 and 14 define for the balls 15 and 16 the roller tracks displaying a concave profile symmetrical with respect to a central point C located at half the distance from the ends closed by the plates 17 of the bodies 13 and 14. More particularly, the internal passage of the tubular bodies 13 and 14 displays the form of two identical truncated cones 13a, 13b on one hand, 14a, 14b on the other, which are brought together at their larger bases. However, the truncated cones 13a and 13b do not have the same angle at the peak as the truncated cones 14a and 14b. Thus the angle at the peak of the truncated cones 13a and 13b, which corresponds to the slope $\alpha$ of the roller track of the ball 15, is very small, for example 40 minutes, so as to permit detection of a lack of horizontality with a minimum of error, while ensuring that the ball will be in rest position equidistant between the plates 17 when the body 13 is perfectly horizontal. In contrast, the angle at the peak of the truncated cones 14a and 14b is definitely greater, for example of the order of 5°, since it is equal to the maximum inclination beyond which the containers must not be raised to avoid displacement of their contents. This angle at the peak, namely the angle $\beta$ of inclination of the track of the ball 16, is thus determined as a function of the result to be achieved.

Also, again referring to FIGS. 1 and 2, the attitude correction apparatus is complemented by two supplementary proximity detectors 22 and 23 in front of which may be located a plate 24 integral with the assembly 9, which serves as end of run security when the angle of rotation of the assembly 9 caused by the reduction motor 5 exceeds a predetermined maximum value. In effect, when the case 2 and the assembly 9 are in a horizontal position, the plate 24 overlaps simultaneously the detectors 22 and 23, and these do not intervene in the operation of the reduction motor 5. In contrast, as will be explained in greater detail below with regard to FIG. 4, when the assembly 9 rocks to the point where the plate uncovers one or the other of the two detectors 22 and 23, this one provokes the interruption of power to the motor 5, thus limiting the tilting of the assembly 9. Finally, as represented in FIG. 2, the group of proximity detectors 18, 19, 20, 21, 22 and 23 is connected to a connector box 25.

Reference will now be made to FIG. 5, which shows schematically an attitude correction apparatus 1 installed on a grabbing mechanism 26 comprising a frame 27 bolted onto a container 28, and linked to a hoisting engine (not represented) by the intermediary of a carriage 30 movable along the frame 27 following a longitudinal reference direction of the frame which is parallel to the plane in which the assembly 9 of the attitude correction assembly 1 is free to rock. The movement of translation of the carriage 30 along the frame 27 is controlled by a jack which is not represented in the drawing. A detailed description of the frame 27, of the carriage 30, of the aforementioned jack, and of the means of bolting the frame 27 to the container 28, is given in the French patent application number 77.27 295 and U.S. Pat. No. 4,245,941 cited previously to which reference can be made, it being understood that the attitude correction mechanism 1 can be used with any other analogous grabbing apparatus by means of which the point of suspension of the frame to the hoisting engine can be displaced under control of signals issued by the attitude corrector 1.

FIG. 4 is a simplified electrical schematic of illustrating control of the grabbing apparatus of FIG. 5. As this schematic shows, the reduction motor 5 is connected on the one hand directly to a power lead 31, and on the other hand to a power lead 32 through the intermediary of two parallel paths 33 and 34. By convention, it will be assumed that the motor 5 turns in the clockwise direction when it is connected to the power lead 32 by the path 33, and in the counterclockwise direction when it is connected to the same power lead by the path 34. The power leads 31 and 32 are themselves connected to a source of electric power (not represented). In addition, electric regulators D and G for controlling the displacement jack of the carriage 30 are connected in parallel in the paths 35 and 36 between the power leads 31 and 32. A commutator 37 with two positions A and B enables control of the application of voltage to the paths 33 and 34 on the one hand, and 35 and 36 on the other. The path 33 includes, in series between the terminal A of the commutator 37 and the motor 5, a normally closed contact C22 controlled by the proximity detector 22, and a normally open contact C18a controlled by the proximity detector 18. In the same way, the path 34 includes in series between the terminal A and the motor 5, a normally closed contact C23 controlled by the proximity detector 23 and a normally open contact C19a controlled by the proximity detector 19. In addition, a contact C18b controlled by the proximity detector 18 is placed in the path 35, and a contact also normally open C19b controlled by the proximity detector 19 is placed in the path 36. The circuit is completed by the normally closed contacts C20 and C21 controlled respectively by the proximity detectors 20 and 21, and arranged in series in the power circuit of the motor L of the hoisting engine (not represented).

In operation, when the grabbing mechanism 27 has been brought to a container 28 as represented in FIG. 5 and bolted to it as described, for example in the French patent application and U.S. patent cited previously, the ball 15 leaves the point C if the inclination of the container 28 is greater than the accepted uncertainty, namely the inclination $\alpha$ of the track of the ball 15. If it is assumed, as is the case in FIG. 5, that the container is leaning to the right, the ball 15 rests against the end plate 17 adjacent to the proximity detector 19. Having detected the presence of the ball 15, this detector thus holds the contact C19a closed. The movable contact of the commutator 37 is thus brought to the position A, which results in powering the reduction motor 5 through the intermediary of the path 34, and to cause it to turn in the counterclockwise direction, which tends to bring the assembly 9 back to the horizontal. When this reaches 40 minutes from the horizontal, the ball 15 begins to roll toward the center C of its track, and, having left the vicinity of the detector 19, this latter opens the contact C19a, so that the power supply of the reduction motor 5 is interrupted. At the same time, the response time of the assembly has the result that a slight supplementary travel is effected from the moment at which the inclination is brought back to 40 minutes, so that at the time of stopping, the assembly 9 has returned to practically horizontal. In the course of this phase, the contacts C22 and C23 remain in principle closed, unless the plate 24 has uncovered the proximity detector 23, which signifies that the assembly 9 has tilted beyond a maximum authorized value.

The grabbing mechanism 26 and the attitude correction mechanism 1 thus being in the state represented in FIG. 6, the container is raised slightly, and then takes on a certain attitude as a function of the position of its center of gravity with respect to the vertical from the point of suspension. Barring an exceptional coincidence, this attitude will not be equal to its initial inclination γ (FIG. 5), with the result that the ball 15 will roll again in one direction or the other, depending on the direction of this inclination. If, as represented in FIG. 7, the container 28 tends to straighten, the ball 15 rolls toward the left, and comes to rest against the end plate 17, so that the proximity detector 18 closes the contact C18b. If the movable contact of the commutator 37 is thus brought into the position B, the electric regulator D is powered, and causes displacement of the carriage 30 until, the assembly 9 having returned to the horizontal, the ball leaves the plate 17 and halts the movement of the carriage 30. The container 28 is thus returned to parallel to its initial position, and displays an inclination γ to the horizontal.

Naturally, if in the course of this latter operation, the inclination of the container 28 reaches 5°, the ball 16 comes into the vicinity, depending on the direction of the inclination, of one or the other of the detectors 20 and 21, which then opens its corresponding contact C20 or C21 and interrupts the power supply of the motor L of the hoisting engine, thus maintaining the inclination of the container at a maximum of 5°. Of course, it is to be understood that the detectors 20, 21, 22 and 23 are provided only as security, and the system could function with the single level detector constituted by the body 13 and the ball 15 associated with the proximity detectors 18 and 19. The ball level detector according to the invention presents numerous advantages with respect to a liquid level detector. Thus, first of all, the precision of stopping is constant, because the ball remains in contact with the detector up to an inclination equal to that of its track, namely 40 minutes in the axample considered. Furthermore, this precision of operation is independent of temperature, inclinations which can reach 30° and more can be achieved, and the ball displays a stable position at the horizontal, thus eliminating the risks of fluctuation in operation. Finally, the ball level detector according to the invention is lesser in weight and encumbrance.

Modifications will occur to those skilled in the art and such are considered to fall within the spirit and scope of the invention as defined in the appended claims.

I claim:

1. Level detecting apparatus for grabbing apparatus of the type comprising a frame suspended at a point from a manipulating engine, the frame being adapted for connection to a load to be hoisted, the load having an initial inclination, and means for displacing the point of suspension in a reference direction of the frame, the level detecting apparatus comprising a level detector adapted for connection to the frame so as to pivot in a vertical plane parallel to the reference direction and to provide an output signal when the level detector has a predetermined deviation from horizontal, actuating means for pivoting the level detector in said plane, first means responsive to said output signal for controlling, upon the frame being connected to the load and prior to hoisting, the actuating means so as to pivot the level detector to a horizontal position and for thereafter inhibiting the operation of the actuating means so as to fix the relative position of the level detector with respect to the frame, and second means responsive to said output signal for controlling, upon hoisting of the load, the displacing means so as to position the point of suspension to one in which deviation from horizontal of the level detector is cancelled, and wherein said level detector comprises a tubular body having closed ends and a slightly concave roller track, a ball adapted to roll on the roller track toward one end or the other of the tubular body as a function of the inclination of the level detector with respect to horizontal, and detector means for detecting the presence of the ball at each of said closed ends and for emitting said output signal in response to said detecting.

2. Level detecting apparatus according to claim 1, wherein said ball is a metallic ball and said detector means comprises inductive detectors positioned outside of the said closed ends of the body.

3. Level detecting apparatus according to claim 1, wherein said tubular body is closed at each of its ends by a wall of a supple material.

4. Level detecting apparatus according to claim 1, wherein said roller track presents a concave profile that is symmetrical with respect to a central point at half the distance from the said closed ends.

5. Level detecting apparatus according to claim 4, wherein said tubular body presents internally a form corresponding to two identical truncated cones connected at their larger bases.

6. Level detecting apparatus for grabbing apparatus of the type comprising a frame suspended at a point from a manipulating engine, the frame being adapted for connection to a load to be hoisted, the load having an initial inclination, and means for displacing the point of suspension in a reference direction of the frame, the level detecting apparatus comprising first and second level detectors adapted for connection to the frame so as to pivot in a vertical plane parallel to the reference direction and to provide first and second output signals, respectively, when the level detectors have predetermined deviations from horizontal, actuating means for pivoting the level detectors in said plane, first means responsive to said first output signal for controlling, upon the frame being connected to the load and prior to hoisting, the actuating means so as to pivot the level detectors to a horizontal position and for thereafter inhibiting the operation of the actuating means so as to fix the relative positions of the level detectors with respect to the frame, second means responsive to said first output signal for controlling, upon hoisting of the load, the displacing means so as to position the point of suspension to one in which deviation from horizontal of the level detectors is cancelled, and third means responsive to the second output signal for limiting the inclination of the load, and wherein each of said level detectors comprises a tubular body having closed ends and a slightly concave roller track, the concavity of the roller track of the second level detector being greater than that of the first level detector, a ball adapted to roll on the roller track toward one end or the other of the tubular body as a function of the inclination of the level detector with respect to horizontal, and detector means for detecting the presence of the ball at each of said closed ends and for emitting said output signals in response to said detecting.

7. Apparatus according to claim 6, wherein the third means interrupts the hoisting of the load by the said manipulating engine in response to the detection of the ball of the second level detector, the concavity of the track of the second level detector being selected to afford a predetermined maximum authorized inclination of the load, so that the detection of the ball by the detecting means corresponds to an inclination of the second level detector equal to the said maximum authorized inclination of the load.

8. Apparatus according to claim 6, wherein the concavity of the track of the first level detector is selected such that the detection of the ball of the first level detector corresponds to an inclination of the first level detector of the order of approximately a few tens of minutes of angle.

9. Apparatus according to claim 6, wherein the said first and second level detectors together form an assembly articulated on a support.

10. Apparatus according to claim 9, wherein said actuating means comprises a reduction motor on the shaft of which is mounted the said assembly.

11. Apparatus according to claim 9, wherein said assembly bears a plate adapted to oscillate in front of two auxiliary proximity detectors, with the width of the said plate and the relative positions of the said auxiliary proximity detectors being selected to interrupt the power of the said actuating means when a proximity detector is uncovered by the said plate.

12. Apparatus according to claim 6, wherein the concavity of the track of the second level detector is selected such that the detection of the ball of the second level detector corresponds to an inclination of the order of approximately a few degrees of angle.

13. Level detecting apparatus comprising an assembly adapted to be pivotally supported on a frame that is movable in a vertical direction, the assembly having first and second level detectors, each comprising a tubular body having closed ends, an internal roller track, a ball adapted to roll along the track, and detectors at each of the closed ends for providing corresponding signals upon detecting the presence of the ball at the ends, the track of the first tubular body having a first predetermined concavity so as to provide first signals upon the assembly assuming a first predetermined inclination with respect to horizontal, the track of the second tubular body having a second predetermined concavity greater than the first predetermined concavity for providing second signals upon the assembly assuming a second predetermined inclination greater than the first predetermined inclination, and means responsive to said signals for controlling the inclination of the frame during said vertical movement.

14. Apparatus according to claim 13, wherein the frame has an initial inclination with respect to horizontal, and means are included for pivoting the assembly to a horizontal position and for fixing the relative position of the assembly with respect to the frame prior to said vertical movement.

15. Apparatus according to claim 14, wherein the controlling means is responsive to said signals for maintaining the initial inclination of the frame during said vertical movement.

16. Apparatus according to claim 14 further comprising proximity detector means on the frame and a plate connected to the assembly that is adapted to move with respect to the proximity detector means upon movement of the assembly with respect to the frame, the width of the plate being selected so as to assume a position where the plate is not detected by the proximity means when the frame has an inclination greater than a predetermined amount, and means responsive to an output signal from the proximity detector means for inhibiting the vertical movement of the frame upon the plate assuming such position.

* * * * *